(12) United States Patent
Kang et al.

(10) Patent No.: US 9,308,567 B2
(45) Date of Patent: Apr. 12, 2016

(54) METHOD OF MANUFACTURING PRESS MOLD FOR MASS-PRODUCING HOT STAMPING COLD TRIM AND PRESS MOLD FOR MASS-PRODUCING HOT STAMPING COLD TRIM MANUFACTURED USING THE SAME

(71) Applicants: Kia Motors Corporation, Seoul (KR); TNP CORPORATION, Changju-si (KR)

(72) Inventors: Chul Ho Kang, Anyang-si (KR); Deuk Yong Kim, Incheon (KR); Sang Hwan Jun, Suwon-si (KR); Jae Woo Lee, Chungju-si (KR)

(73) Assignees: KIA MOTORS CORPORATION, Seoul (KR); TNP CORPORATION, Seoul (KR)

( * ) Notice: Subject to any disclaimer, the term of this patent is extended or adjusted under 35 U.S.C. 154(b) by 218 days.

(21) Appl. No.: 14/074,560

(22) Filed: Nov. 7, 2013

(65) Prior Publication Data
US 2015/0000365 A1    Jan. 1, 2015

(30) Foreign Application Priority Data

Jun. 26, 2013   (KR) .................... 10-2013-0073543

(51) Int. Cl.
*B21D 35/00* (2006.01)
*B23K 31/02* (2006.01)
(Continued)

(52) U.S. Cl.
CPC ............ *B21D 35/001* (2013.01); *B21D 22/208* (2013.01); *B21D 24/16* (2013.01); *B21D 37/01* (2013.01); *B21D 37/20* (2013.01); *B23K 31/02* (2013.01)

(58) Field of Classification Search
CPC ...... B21D 37/01; B21D 37/20; B21D 37/205; Y10T 29/49622
USPC .............. 72/294, 335; 83/694; 76/107.1, 116
See application file for complete search history.

(56) References Cited

U.S. PATENT DOCUMENTS 3,234,774 A * 2/1966 Margedant ............. B21D 37/10
                                                          72/294
4,864,094 A * 9/1989 Saltzman ................ B23K 9/04
                                                          219/76.16
(Continued)

FOREIGN PATENT DOCUMENTS

JP           7-246430 A      9/1995
JP        2000-271666 A     10/2000
(Continued)

*Primary Examiner* — Jason L Vaughan
(74) *Attorney, Agent, or Firm* — Morgan, Lewis & Bockius LLP

(57) ABSTRACT

A method of manufacturing a press mold for mass-producing a hot stamping cold trim includes bonding first and second steel bodies made of different materials to form a single body mold material, polishing a bottom surface and one edge surface of the mold material with processing margins, processing edge surfaces other than the one edge surface on which a bonding part is positioned, processing reference holes for guide pins and a reference surface, forming bolt holes penetrating through the reference surface and the bottom surface, processing a surface of the first steel body in a predetermined shape, heat-treating the mold material, and polishing the bottom surface and the one edge surface having the processing margins at desired accurate dimensions and wire-processing the one edge surface with the processing margin to configure a front end part having the desired accurate dimension.

9 Claims, 8 Drawing Sheets

(51) Int. Cl.
  *B21D 22/20* (2006.01)
  *B21D 24/16* (2006.01)
  *B21D 37/01* (2006.01)
  *B21D 37/20* (2006.01)

(56) References Cited

U.S. PATENT DOCUMENTS

| | | | |
|---|---|---|---|
| 5,140,882 A * | 8/1992 | Hyder | B31B 45/00 83/620 |
| 5,327,806 A * | 7/1994 | Houser | B23D 35/001 76/DIG. 11 |
| 5,423,240 A * | 6/1995 | DeTorre | B23D 35/001 30/350 |
| 6,397,651 B2 * | 6/2002 | Usui | B21D 37/20 219/121.47 |
| 8,261,591 B2 * | 9/2012 | Hielscher | B21D 24/16 72/334 |
| 8,578,750 B2 * | 11/2013 | Fang | B21D 24/16 72/294 |
| 9,017,830 B2 * | 4/2015 | Yamamoto | B21D 28/00 427/530 |
| 2003/0131699 A1 * | 7/2003 | Lai | B26D 1/0006 83/13 |

FOREIGN PATENT DOCUMENTS

| | | |
|---|---|---|
| JP | 2000-317544 A | 11/2000 |
| JP | 2001-71048 A | 3/2001 |
| KR | 10-2014-0034952 A | 3/2014 |

* cited by examiner

METHOD OF MANUFACTURING PRESS MOLD FOR MASS-PRODUCING HOT STAMPING COLD TRIM AND PRESS MOLD FOR MASS-PRODUCING HOT STAMPING COLD TRIM MANUFACTURED USING THE SAME

CROSS-REFERENCE TO RELATED APPLICATION

The present application claims priority of Korean Patent Application Number 10-2013-0073543 filed on Jun. 26, 2013, the entire contents of which application are incorporated herein for all purposes by this reference.

BACKGROUND OF INVENTION

1. Field of Invention

The present invention relates to a method of manufacturing a press mold for mass-producing a hot stamping cold trim and a press mold for mass-producing a hot stamping cold trim manufactured using the same, and more particularly, to a method of manufacturing a press mold for mass-producing a hot stamping cold trim capable of significantly decreasing a cost required to develop a mold that may perform press-cutting on a 150 kg-level steel sheet and increasing a lifespan of the mold by improving strength of steel at a minimum cost through diffusion bonding, and a press mold for mass-producing a hot stamping cold trim manufactured using the same.

2. Description of Related Art

Currently, in accordance with a high oil price age in which an international oil price has continuously surged after 2002, an ultimate object capable of increasing competitiveness against other companies in a vehicle industry is to improve fuel efficiency of a vehicle. In order to improve the fuel efficiency, lightness of a vehicle body has been urgently demanded.

Therefore, carmakers of all the countries of the world as well as component producing companies supplying related components to these carmakers have developed a more excellent material and have produced vehicle body components using various materials having a higher toughness such as 490 MPa→4590 MPa→4980 MPa, in order to decrease a weight of a vehicle body component as light as possible and increase durability. However, as the material has gradually become tough as described above, a moldability problem that it is difficult to mold the material in a desired form has been generated. Therefore, various molding methods such as a hot stamping method, and the like, rather than a general press molding method have been introduced. The hot stamping scheme indicates a hot stamp scheme of increasing a tensile strength of the material to 150 kg by heating a temperature of the material to 600° C. to mold the material and then cooling the material.

FIGS. 1A and 1B are cross-sectional views showing states before and after an edge of a material is cut using a steel mold made of a general cold alloy tool steel (SKD-11) according to the prior art, respectively. As shown in FIGS. 1A and 1B, when an edge of a product 10 molded in a predetermined form is to be cut, in the case in which the product 10 is made of a 150 kg-level steel sheet, a steel rigidity problem that the product 10 molded in the predetermined form and made of the 150 kg-level steel sheet may not be trimmed using a steel mold 20 made of the cold alloy tool steel (SKD-11) is generated, such that a trimming work may not be continuously performed, which causes a decrease in a mass-production property.

In order to solve this problem, the entire steel mold 20 may be made of a superhard alloy such as a superhard steel or a powder high speed steel so that the product made of the 150 kg-level steel sheet may be easily trimmed. However, since the superhard alloy is very expensive, a press mold cost is significantly increased, which causes an excessive increase in a cost of a produced product and decrease competitiveness.

In consideration of these problems, some companies have produced a product in a scheme of laser-cutting an unnecessary edge portion of the product using a laser processing device as disclosed in Korean Utility Model Registration No. 0127057 (Korean Utility Model Laid-Open Publication No. 1996-004214) mentioned in the following Prior Art Document.

That is, as shown in FIG. 2, which is a view showing a state of cutting an edge of a product using a laser processing device according to the prior art, a product molded using a 150 kg-level steel sheet is laser-cut along a form of the product using the laser processing device 30 in a state in which it is disposed on a work jig 40. However, in this scheme, since the product is laser-cut along the edge of the form in the molded product, an excessive cutting time and an excessive cutting cost are required to complete one product, which causes an increase in a cost and significantly decrease price competitiveness.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve at least some of the above-mentioned problems occurring in the prior art while advantages achieved by the prior art are maintained intact.

Various aspects of the present invention provide for a method of manufacturing a press mold for mass-producing a hot stamping cold trim capable of significantly decreasing a cost required to develop a mold and increasing a lifespan of the mold by providing a press mold in a hot stamping scheme that may perform press-cutting on a 150 kg-level steel sheet at a cheaper cost, and a press mold for mass-producing a hot stamping cold trim manufactured using the same.

In various aspects of the present invention, there is provided a method of manufacturing a press mold for mass-producing a hot stamping cold trim, including: a first step of bonding a first steel body corresponding to a superhard steel body and a second steel body corresponding to a hot alloy tool steel body, which are made of different materials, to each other to form a single body mold material; a second step of polishing a bottom surface and one edge surface of the mold material with processing margins; a third step of processing edge surfaces of the mold material other than the one edge surface among four edge surfaces on which a bonding part of the mold material is positioned; a fourth step of processing reference holes for guide pins of the mold material and a reference surface; a fifth step of forming a plurality of bolt holes penetrating through the reference surface and the bottom surface of the mold material; a sixth step of processing a surface of the first steel body made of a superhard material in a multi-stage shape based on two reference holes to produce the surface in a predetermined shape; a seventh step of heat-treating the mold material; and an eighth step of polishing the bottom surface and the one edge surface having the processing margins at a desired accurate dimension or desired accurate dimensions and wire-processing the one edge surface with the processing margin to configure a front end part having the desired accurate dimension, by applying a correction value based on a numerical value table of measurement values depending on a processing condition.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
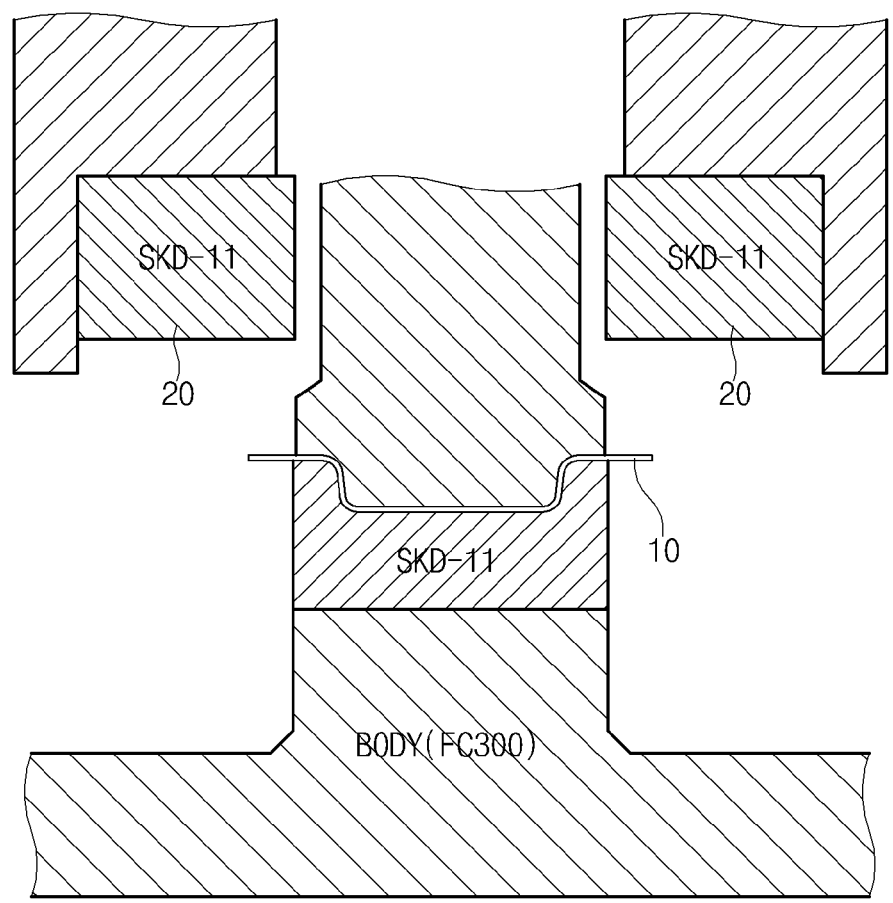
FIGS. 1A and 1B are cross-sectional views showing states before and after an edge of a material is cut using a steel mold made of a general cold alloy tool steel (SKD-11) according to the prior art, respectively.
Figure 1B:
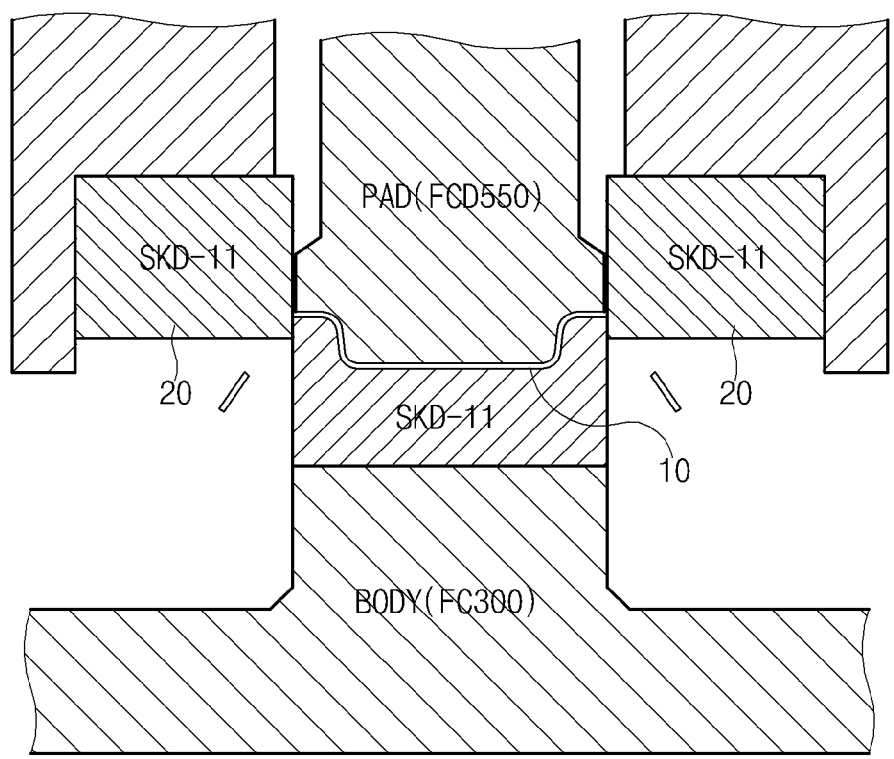
Figure 2:
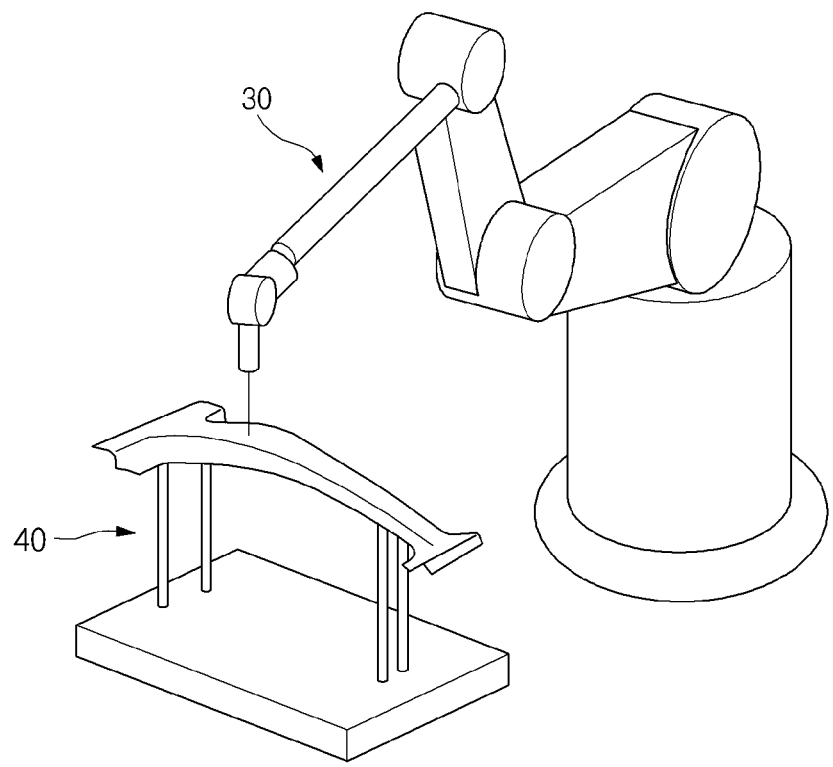
FIG. 2 is a view showing a state of cutting an edge of a product using a laser processing device according to the prior art.
Figure 3:
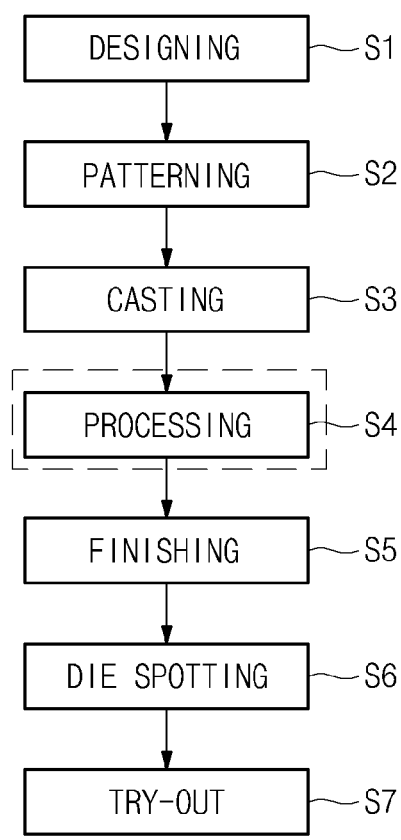
FIG. 3 is a block diagram showing a method of manufacturing a press mold according to the present invention.

FIG. 3 is a block diagram showing a method of manufacturing a press mold for mass-producing a hot stamping cold trim according to various exemplary embodiments of the present invention. As shown in FIG. 3, the method of manufacturing a press mold for mass-producing a hot stamping cold trim includes a designing step (S1), a patterning step (S2), a casting step (S3), a processing step (S4), and a finishing step (S5). Then, the manufactured press mold is subjected to a spotting step (S6) of confirming whether it has been accurately disposed at an accurate position and a try-out step (S7) of testing whether press-cutting has been actually performed appropriately and is supplied to a client in the case in which the press mold has been accurately disposed at the accurate position and the press-cutting has been actually performed appropriately.

The designing step (S1) is a step of making a diagram for manufacturing the press mold, and a design diagram may be made in a two-dimension (2D) or a three-dimension (3D). The patterning step (S2) is a step of manufacturing a pattern having the same size or substantially the same size as that of an actual mold using Styrofoam based on the diagram designed in the designing step (S1). The casting step (S3) is a step of putting the pattern using the Styrofoam in the patterning step (S2) in a flask, hardening the pattern using sand, and then pouring a casting solution into the flask to manufacture a steel body having the same shape.

The processing step (S4) is a step of machining six bottom surfaces, a shape part, and the like, so as to form a predetermined shape in order to assemble and attach various components and other steels to the steel body manufactured by the casting, or the like, in the casting step (S3). The finishing step (S5) is a step of finely finishing a hole edge, a corner portion, or the like, of the press mold for which various workings in a predetermined shape are completed in the processing step using a tool such as a grinder, or the like (S4).

Figure 4A:
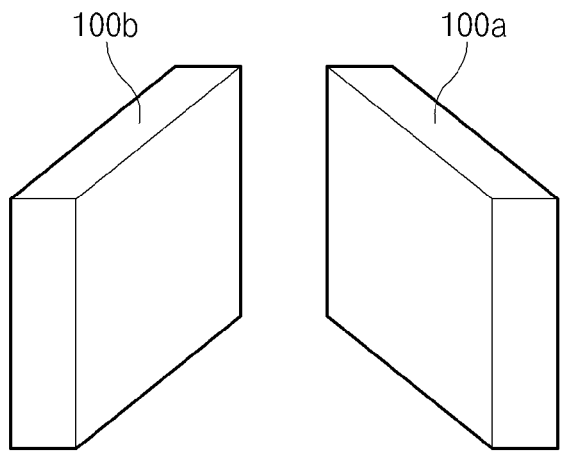
FIGS. 4A and 4B are perspective views showing different steel bodies for manufacturing a press mold according to the present invention.
Figure 4B:
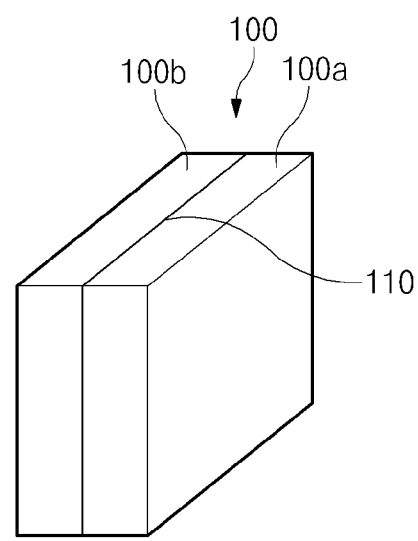

The steps of the method of manufacturing a press mold for mass-producing a hot stamping cold trim as described above are similar to those of a general method of manufacturing a press mold, except for the processing step (S4). The processing step (S4) in the present invention overcomes a material problem of steel to be cut, and is more advanced and/or complicated as compared with a cutting mold made of a general cold alloy tool steel (SKD-11), which is a characteristic configuration of the present invention. FIGS. 4A and 4B are perspective views showing different steel bodies for manufacturing a press mold and FIGS. 5A to 5D are views showing the method of manufacturing a press mold according to various exemplary embodiments of the present invention. Each step of the method of manufacturing a press mold according to various exemplary embodiments of the present invention will be described for each step with reference to FIGS. 4A to 5D.

First Step (Step of Bonding Different Steel Bodies to Each Other)

A steel material for manufacturing a press mold may include two steel bodies 100a and 100b, that is, first and second steel bodies, made of different materials, as shown in FIG. 4A. That is, the first steel body 100a forming a front end part 101 of the press mold and disposed at one side may be made of a superhard steel material such as a superhard steel or a powder high speed steel and the second steel body 100b forming other portions and disposed at the other side is made of SKD-61, which is a hot alloy tool steel of which molecules are easily mixed with the superhard steel, among alloy tool steels. Reference bonding surfaces (surfaces for bonding the two steel bodies 100a and 100b to each other) of the two steel bodies 100a and 100b provided as described above are surface-processed and are then closely adhered to each other, such that the two steel bodies 100a and 100b are bonded to each other so as to be a single body mold material 100 forming a hexahedron as shown in FIG. 4B.

In the step of bonding the two steel bodies 100a and 100b made of different materials, the two steel bodies 100a and 100b are bonded integrally with each other by well-known diffusion bonding or brazing bonding so as to form one mold material 100.

Here, the diffusion bonding indicates bonding the two steel bodies 100a and 100b to each other by closely adhering bonding surfaces of the steel body 100a made of the superhard material and the steel body 100b made of the alloy tool steel, which are stacked, to each other and heating the two steel bodies 100a and 100b to a predetermined temperature using heat of a furnace and then performing a quenching work of rapidly cooling the two steel bodies 100a and 100b while pressing the bonding surfaces in a vacuum state to mix molecules of the two steel bodies 100a and 100b contacting each other with each other. In addition, the brazing bonding indicates bonding the two steel bodies made of different materials to each other by inserting an insertion material for brazing between the bonding surfaces of different materials and performing heating in a furnace to melt the insertion material. Since the brazing bonding has been well known in a welding field, a detailed description thereof will be omitted.

Second Step (Step of Processing Bottom Surface and Edge Surface)

Figure 5A:
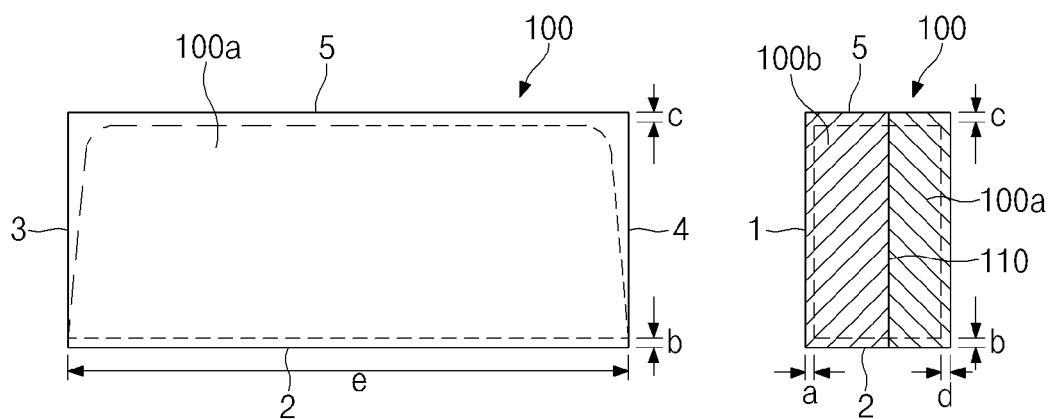
FIGS. 5A to 5D are views showing the method of manufacturing a press mold according to the present invention.

In the state in which the two steel bodies 100a and 100b made of different materials are bonded to each other to form the single body mold material 100 as shown in FIG. 4B, a bottom surface 1 and one edge surface 2 perpendicular to the bottom surface 1 among six surfaces of the mold material 100 are polished as shown in FIG. 5A. Here, when the bottom surface 1 and the one edge surface 2 are polished, they should be polished with processing margins a and b corresponding to a predetermined thickness in consideration of a deformation amount at the time of heat treatment. The reason is that a correction value may be applied in consideration of a measurement value depending on a deformation amount value and a processing condition at the time of the following heat treatment.

Third step (Step of Processing Other Edge Surfaces)

Edge surfaces 3, 4, and 5 other than the edge surface 2 among four edge surfaces on which a bonding part of the two steel bodies 100a and 100b is positioned are milled. Here, since two edge surfaces 3 and 4 facing each other as shown in FIG. 5A are not assembled surfaces, they are milled at a width e determined in accordance with an accurate dimension or with desired accuracy, and the one edge surface 5 to be formed as a front end part 101 is milled with a processing margin for wire processing. The reason is that a correction value may be applied in consideration of a measurement value depending on a processing condition at the time of processing after the following heat treat work.

Fourth Step (Step of Processing Reference surface and Reference Hole)

Figure 5B:
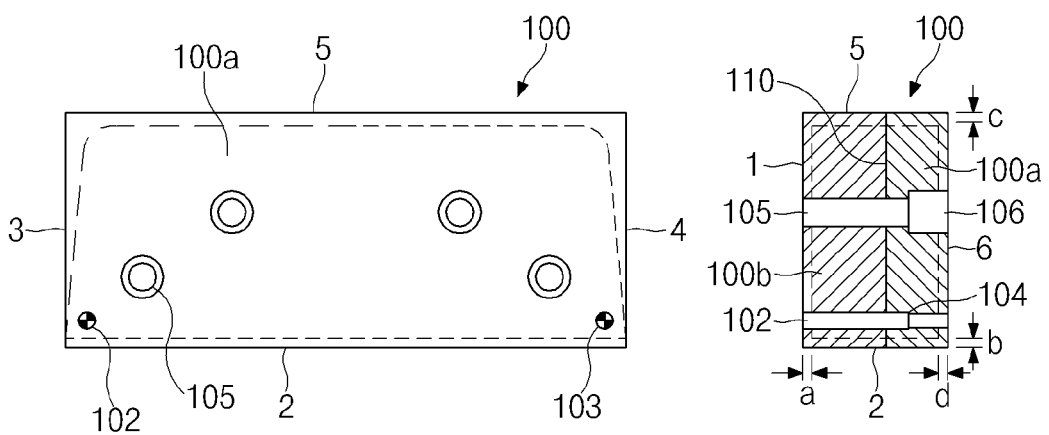

This step is a step of processing reference holes 102 and 103 into which guide pins are fitted and a reference surface 6 as shown in FIG. 5B in order to guide the press mold so as to be mounted at an accurate position. Here, the reference surface 6 is processed in consideration of a predetermined processing margin d at the time of being polished, and the reference holes 102 and 103 are processed so that the superhard steel body 100a is provided with a step 104. Therefore, since front ends of the reference holes 102 and 103 on which tension is concentrated when the guide pins are fitted thereinto have durability due to the superhard material, a lifespan of the press mold may be increased.

Fifth Step (Step of Processing Mold Coupling Hole)

This step is a step of drilling and boring a plurality of bolt holes 105 for mounting the press mold by penetrating through the reference surface 6 and the bottom surface 1 of the mold material 100 bonded as a single body as shown in FIG. 5B. In this case, a bolt head mounting groove part 106 should be formed at the highest height at one side of the bolt hole 105 so as to be positioned at a portion of the superhard steel body 100a as shown in FIG. 5B so that a bolt fitted into the bolt hole 105 may press the bonding surface portion 110 of the two steel bodies 100a and 100b made of different materials.

Sixth Step (Step of Processing Three-Dimensional Shape of Reference Surface)

Figure 5C:
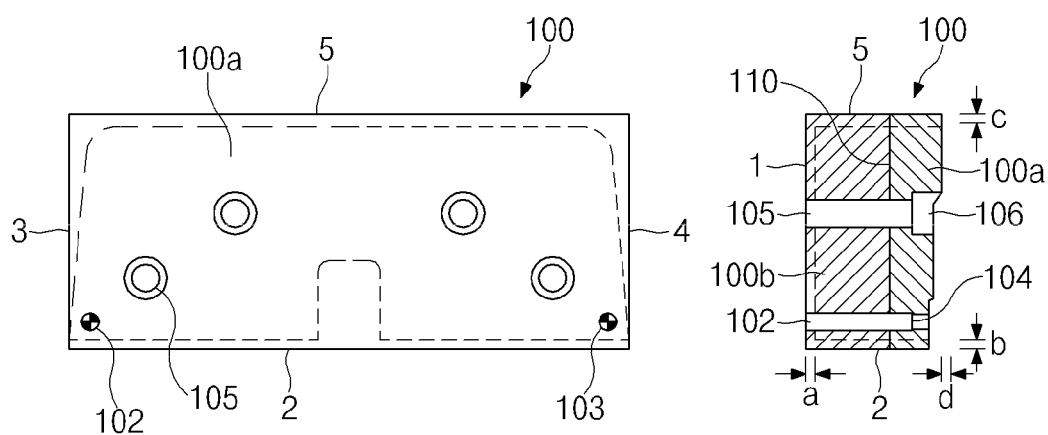

This step is a step of processing the reference surface 6, which is one surface of the steel body 100a made of the superhard material in the mold material 100, so as to be formed in a three-dimensional predetermined shape based on two reference holes 102 and 103, as shown in FIG. 5C.

Seventh Step (Heat Treatment Step)

This step is a step of performing a heat treatment work of heating the mold material 100 formed in the predetermined shape to a high temperature and then performing quenching for rapidly cooling the mold material 100 to increase a hardness of the two steel bodies 100a and 100b forming the mold material 100 as high as possible.

Eighth Step (Process Step of Applying Correction Value (Tolerance))

Figure 5D:
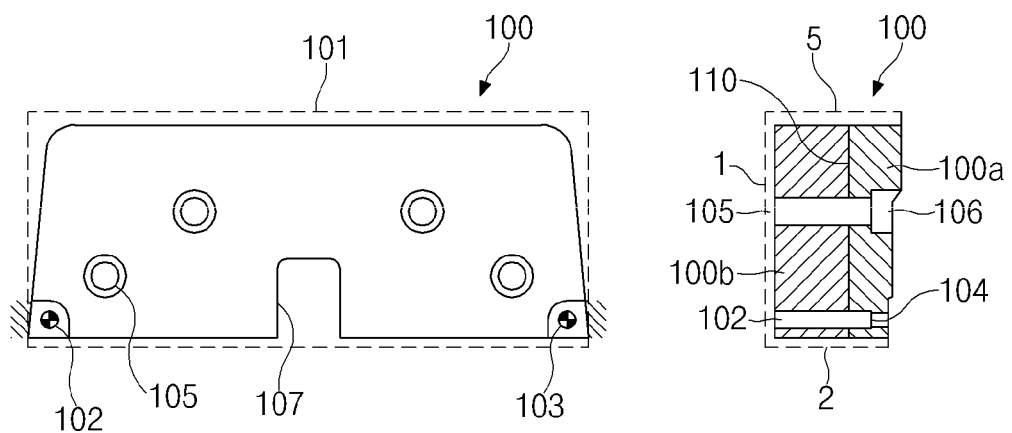
Figure 6:
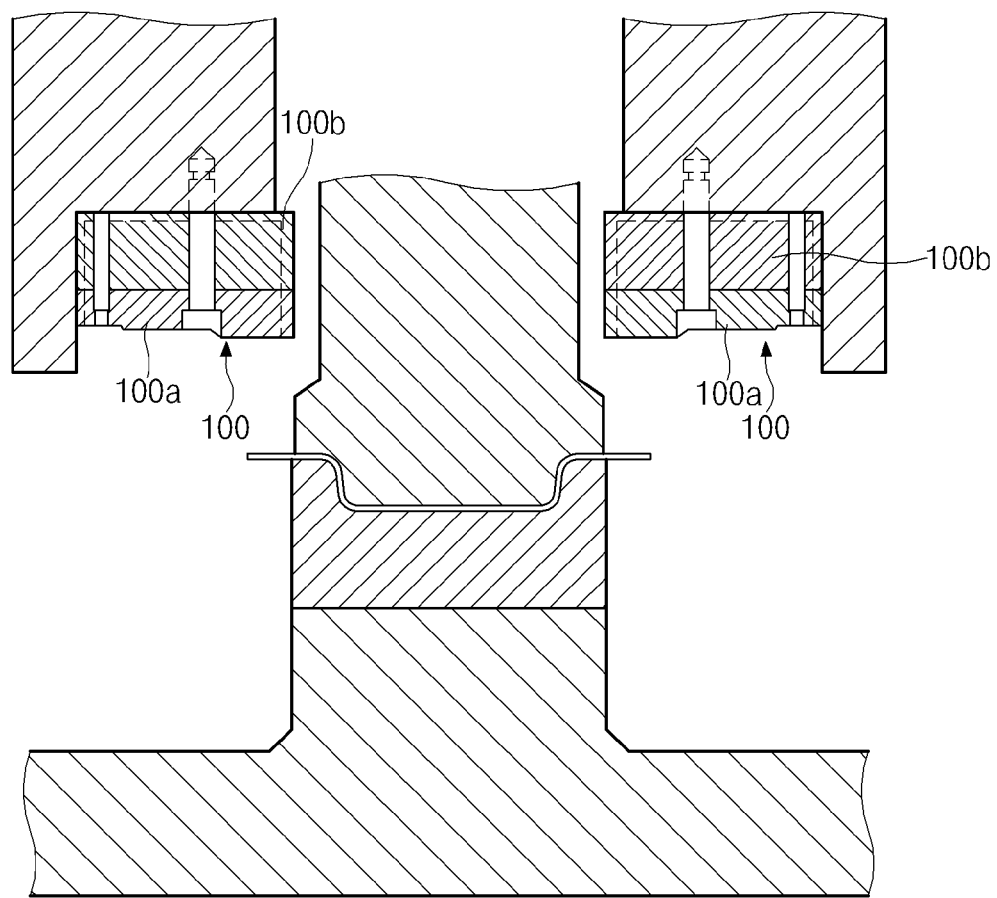
FIG. 6 is a side cross-sectional view showing a state in which a press mold for mass-producing a hot stamping cold trim according to the present invention is used.

This step is a step of polishing the bottom surface 1 and the one edge surface 2 polished with predetermined processing margins a and b in the second step in consideration of deformation at the time of heat treatment among the heat-treated six surfaces of the mold material 100 at an accurate dimension or with desired accuracy by applying a correction value (tolerance) based on a numerical value table of measurement values depending on a processing condition as shown in FIG. 5D.

In addition, this step is a step of processing the front end part 101 and a groove part 107 having a predetermined shape by wire processing at the remaining edge surfaces 3, 4, and 5 among the edge surfaces on which the bonding part of the two steel bodies 100a and 100b is positioned and one side of the mold material 100 at an accurate dimension or with desired accuracy by applying the correction value (tolerance) based on the numerical value table of the measurement values depending on the processing condition. Here, since shaded sections positioned at sides of the two reference holes 102 and 103 shown in FIG. 5D need not to be wire-processed, they may be completed by rapid milling processing.

Meanwhile, processing margins a, b, c, and d in the second to fourth steps may be in the range of 0.1 to 1.0 mm according to rigidities of materials. In the case in which the processing margin is less than 0.1 mm, there is a risk that a thermal deformation amount of the bottom surface 1 and the one edge surface 2 of the mold material 100 at the time of heat treatment will be out of a thickness (0.1 mm), such that it is difficult to perform the polishing processing in which the correction value is applied in the eighth step, and in the case in which the processing margin exceeds 1.0 mm, an excessive time is required to perform the polishing processing in which the correction value is applied in the eighth step, such that productivity is decreased. Therefore, the processing margins a, b, c, and d may be maintained in the range of 0.1 to 1.0 mm according to the type or properties of materials.

When all of the polishing and wire processing steps are performed on the six surfaces by the first step in which the two steel bodies 100a and 100b made of different materials are diffusion-bonded to each other to form the single body mold material 100 to the eighth step as described above, products made of a 150 kg-level steel material may be mass-cut well, such that a mass-production property may be improved. Therefore, the press mold for mass-producing a hot stamping cold trim capable of decreasing a development cost and increasing a lifespan may be provided at a more cheap cost.

As set forth above, with the method of manufacturing a press mold for mass-producing a hot stamping cold trim according to the exemplary embodiment of the present invention, at the time of manufacturing the press mold for mass-producing a hot stamping cold trim, since the mold body is manufactured as bodies made of different material such as a general alloy tool steel and a superhard alloy material, the press mold capable of mass-cutting the product made of a 150 kg-level steel sheet well at a less cost is provided, thereby making it possible to improve a mass production property as much as possible. In addition, since the press mold made of different kinds of materials according to the exemplary embodiment of the present invention may decrease a cost required to develop the mold and increase a lifespan of the mold as long as possible, a cost is significantly decreased when a cold trim product is mass-produced, thereby making it possible to improve price competitiveness.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a press mold for mass-producing a hot stamping cold trim, comprising: a first step of bonding a first steel body to a second steel body, which are made of different materials, the first steel body of a superhard steel and the second steel body being of a tool steel having a hardness less than that of the first steel body, to form a single body mold material; a second step of polishing a bottom surface and one edge surface of the mold material such that they include first and second processing margins; a third step of machining edge surfaces of the mold material other than the one edge surface that is among four edge surfaces on which a bonding part of the mold material is positioned; a fourth step of forming reference holes for guide pins of the mold material and a reference surface; a fifth step of forming a plurality of bolt holes penetrating through the reference surface and the bottom surface of the mold material; a sixth step of machining the reference surface of the first steel body made of a superhard material into a multi-stage shape based on two reference holes to produce the surface in a predetermined shape; a seventh step of heat-treating the mold material; and an eighth step of polishing the bottom surface and the one edge surface having the processing margins at a desired accurate dimension or desired accurate dimensions and wire-processing the one edge surface with the processing margin to configure a front end part having a desired accurate dimension, by applying a correction value based on a numerical value table of measurement values depending on a processing condition.

2. The method according to claim 1, wherein the four edge surfaces are processed in accordance with desired accurate dimensions.

3. The method according to claim 1, wherein in the fourth step, the reference surface of the reference holes is processed with a processing margin.

4. The method according to claim 3, wherein the processing margins of the bottom surface and the edge surface of the mold material and the reference surface of the reference holes are in the range of 0.1 to 1.0 mm.

5. The method according to claim 1, wherein a material of the first steel body comprises a superhard alloy.

6. The method according to claim 1, wherein a material of the second steel body comprises a mold steel of SKD-61.

7. The method according to claim 1, wherein in the first step, the first and second steel bodies made of different materials are bonded to each other by diffusion bonding.

8. The method according to claim 1, wherein one or each of the reference holes is processed so that the first steel body is provided with a step.

9. The method according to claim 1, wherein one or each of the plurality of the bolt holes is processed so that the first steel body is provided with a bolt head mounting groove part.

* * * * *